US008254326B2

(12) United States Patent
Hsu

(10) Patent No.: US 8,254,326 B2
(45) Date of Patent: Aug. 28, 2012

(54) METHOD FOR TRANSMITTING POWER HEADROOM REPORT AND BUFFER STATUS REPORT IN A WIRELESS COMMUNICATION SYSTEM AND RELATED COMMUNICATION DEVICE

(75) Inventor: Chia-Chun Hsu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 292 days.

(21) Appl. No.: 12/841,152

(22) Filed: Jul. 21, 2010

(65) Prior Publication Data

US 2011/0080881 A1    Apr. 7, 2011

Related U.S. Application Data

(60) Provisional application No. 61/247,579, filed on Oct. 1, 2009.

(51) Int. Cl.
*H04W 4/00* (2009.01)
*H04J 3/16* (2006.01)
*H04W 72/00* (2009.01)

(52) U.S. Cl. .................. 370/329; 370/468; 455/450

(58) Field of Classification Search .................. None
See application file for complete search history.

(56) References Cited

U.S. PATENT DOCUMENTS

2009/0303954 A1* 12/2009 Guo ........................... 370/329

2012/0099453 A1* 4/2012 Sagfors et al. ............... 370/252
2012/0113845 A1* 5/2012 Kim et al. ..................... 370/252

FOREIGN PATENT DOCUMENTS

WO    2010065759 A2    6/2010

OTHER PUBLICATIONS

3GPP Technical Specification Group Radio Access Network; Evolved Universal Terrestrial Radio Access (E-UTRA); Medium Access Control (MAC) protocol specification (Release 8) v8.6.0, Jun. 2009.
3GPP TSG-RAN WG2 Meeting #63 R2-084764, "LS on considerations on transport block sizes for VoIP", Aug. 2008.

(Continued)

*Primary Examiner* — Clemence Han
(74) *Attorney, Agent, or Firm* — Winston Hsu; Scott Margo

(57) ABSTRACT

A method for transmitting a power headroom report (PHR) and a buffer status report (BSR) for a user equipment in a wireless communication system includes triggering a BSR when a triggering event for the BSR occurs, for reporting a status of an uplink transmission buffer of the user equipment to a network of the wireless communication system, checking whether the BSR is triggered for reporting that the uplink transmission buffer is empty, when the BSR is triggered for reporting that the uplink transmission buffer is empty, checking whether a PHR is triggered and whether there is room for the PHR in an uplink resource according to a priority order, and generating the PHR and transmitting the PHR instead of the BSR to the network when the PHR is triggered and there is not enough room for the PHR in the uplink resource.

12 Claims, 5 Drawing Sheets

OTHER PUBLICATIONS

Nokia Siemens Networks et al: "Addition of Empty BSR-PHR MAC control element", 3GPP TSG-RAN Meeting #67, R2-094213, Aug. 24-28, 2009, XP050352399, Shenzhen, China.

Nokia Siemens Networks et al: "Addition of Empty BSR-PHR MAC control element", 3GPP TSG-RAN Meeting #67, R2-094214, Aug. 24-28, 2009, XP050352414, Shenzhen, China.

Nokia Siemens Networks et al: "Padding PHR", 3GPP TSG-RAN Meeting #66bis, R2-093690, Jun. 29-Jul. 3, 2009, XP050351844, Los Angeles, U.S.A.

HTC Corporation: "Replace empty BSR by PHR", 3GPP TSG-RAN2 Meeting #67bis, R2-095604, Oct. 12-16, 2009, XP050390121, Miyazaki, Japan.

* cited by examiner

METHOD FOR TRANSMITTING POWER HEADROOM REPORT AND BUFFER STATUS REPORT IN A WIRELESS COMMUNICATION SYSTEM AND RELATED COMMUNICATION DEVICE

CROSS REFERENCE TO RELATED APPLICATIONS

This application claims the benefit of U.S. Provisional Application No. 61/247,579, filed on Oct. 1, 2009 and entitled "METHOD AND APPARATUS FOR PHR replacing a empty BSR IN A WIRELESS COMMUNICATIONS SYSTEM", the contents of which are incorporated herein.

BACKGROUND OF THE INVENTION

1. Field of the Invention

The present invention relates to a method for transmitting a power headroom report and a buffer status report for a user equipment in a wireless communication system and related communication device, and more particularly, to a method for transmitting a power headroom report and a buffer status report according to a status of an uplink transmission buffer of a user equipment and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs). The LTE radio protocol stack includes the Layer 3, also known as the Radio Resource Control (RRC) layer, the Layer 2, consisting of three sub-layers that are the Packet Data Convergence Protocol (PDCP) layer, the Radio Link Control (RLC) layer, and the Medium Access Control (MAC) layer, and the Layer 1, also known as the Physical (PHY) layer.

A dynamic scheduling function is used in the UE MAC layer and the eNB MAC layer for utilizing shared channel (SCH) resources. For uplink (UL), an eNB allocates an UL resource to an UE through a physical downlink control channel (PDCCH) signaling. In order to utilize SCH resources more efficiently, a semi-persistent scheduling (SPS) function is further introduced in the LTE system for serving upper layer applications that generate semi-static size data periodically, e.g. VoIP services. The eNB activates SPS resources by sending a PDCCH signaling, and after the SPS activation, SPS resources are periodically allocated to the UE without being through the PDCCH signaling.

According to the UE MAC specification, a Buffer Status Report (BSR) provides the serving eNB with information about the amount of data available for transmission in an UL transmission buffer of the UE. The BSR is one of MAC control elements included in a MAC Protocol Data Unit (PDU). There are three types of BSRs, regular BSR, periodic BSR and padding BSR, caused by different triggering events. The regular BSR is triggered when UL data which belongs to a logical channel with higher priority than those for which data already existed in the transmission buffer arrives at the transmission buffer, when a serving cell change occurs, or when a retransmission BSR timer expires and the UE has data available for transmission. The padding BSR is triggered when UL resources are allocated and the number of padding bits is equal to or greater than the size of a BSR MAC control element. The periodic BSR is triggered when a periodic BSR timer expires, and is used for providing the eNB with updated status of the UE transmission buffer periodically. The regular BSR, the periodic BSR, and the padding BSR are reported by different formats including long BSR, short BSR, and truncated BSR.

In addition, a Power Headroom Report (PHR) provides the serving eNB with information about the difference between the nominal UE maximum transmit power and the estimated power for UL-SCH transmission, which is also one of MAC control elements included in a MAC PDU. Please refer to FIG. 1, which is a diagram illustrating the format of a PHR MAC control element according to the prior art. The PHR MAC control element consists of 2-bit "R" field for reserved bits and 6-bit "PH" field indicating power headroom level. Each reserved bit is set to 0.

The PHR is triggered when a prohibit PHR timer expires and the path loss has changed more than a specific value since the last transmission of a PHR when the UE has UL resources for new transmission, and is also triggered when a periodic PHR timer expires. When the UE has UL resources allocated for new transmission in the current TTI, and at least one PHR has been triggered since the last transmission of a PHR, and the allocated UL resources can accommodate a PHR MAC control element, the UE MAC layer obtains the value of the power headroom from the UE PHY layer, generates a PHR MAC control element based on the value reported by the UE PHY layer, and instructs the UE PHY layer to transmit the PHR MAC control element. Based on the received PHR, the eNB adaptively selects a modulation and coding scheme (MCS) for the UE, and therefore the UE is able to use an appropriate data rate to transmit data for higher transmission efficiency. According to the current MAC specification, the UE MAC layer performs logical channel prioritization to generate a MAC PDU, and the BSR MAC control element has higher priority than the PHR MAC control element.

Note that, when SPS is configured, BSRs are necessary to quickly signal to the eNB the possible occurrence of data that has lower priority than SPS data in the UL transmission buffer. However, BSRs do not help in quickly adapting the MCS for the UE, which is achieved through PHRs. In the case of SPS data transmission, such as VoIP transmission, the transport block size agreed for the E-UTRAN allows a short BSR or a PHR to be transmitted. For VoIP transmission, with every new speech frame, a regular BSR is triggered and sent in an UL resource, and most of BSRs report empty buffer, referred as empty BSRs.

Based on that the BSR has higher priority than the PHR, with every speech frame, no PHR can be sent without segmentation or delay even the BSR reports empty UL transmission buffer; however, the empty BSR seems less important than the PHR. In this situation, the eNB may lose the opportunity to adapt the MCS for the UE promptly due to the late PHR even no PHR. Furthermore, when the UE decides not to segment the VoIP packet by considering logical channel prioritization, the PHR is delayed for a long time, which also decreases transmission efficiency. Therefore, in order to have efficient transmission, it is important for the UE to send the BSR and the PHR when they are surely required.

SUMMARY OF THE INVENTION

The present invention therefore provides a method for transmitting a PHR and a BSR for a UE in a wireless communication system and related communication device.

According to one aspect of the present invention, a method for transmitting a PHR and a BSR for a UE in a wireless communication system includes triggering a BSR when a triggering event for the BSR occurs, for reporting a status of an UL transmission buffer of the UE to a network of the wireless communication system, checking whether the BSR is triggered for reporting that the UL transmission buffer is empty, checking whether a PHR is triggered and whether there is room for the PHR in an UL resource according to a priority order when the BSR is triggered for reporting that the UL transmission buffer is empty, and generating the PHR and transmitting the PHR instead of the BSR to the network when the PHR is triggered and there is not enough room for the PHR in the UL resource.

According to another aspect of the present invention, a communication device of a wireless communication system for transmitting a PHR and a BSR includes means for triggering a BSR when a triggering event for the BSR occurs, for reporting a status of an UL transmission buffer of the communication device to a network of the wireless communication system, means for checking whether a PHR is triggered when the BSR is triggered for reporting that the UL transmission buffer is empty, means for checking whether there is room for the PHR in an UL resource according to a priority order when the BSR is triggered for reporting that the UL transmission buffer is empty and the PHR is triggered, and means for generating the PHR and transmitting the PHR instead of the BSR to the network when the PHR is triggered and there is not enough room for the PHR in the UL resource.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
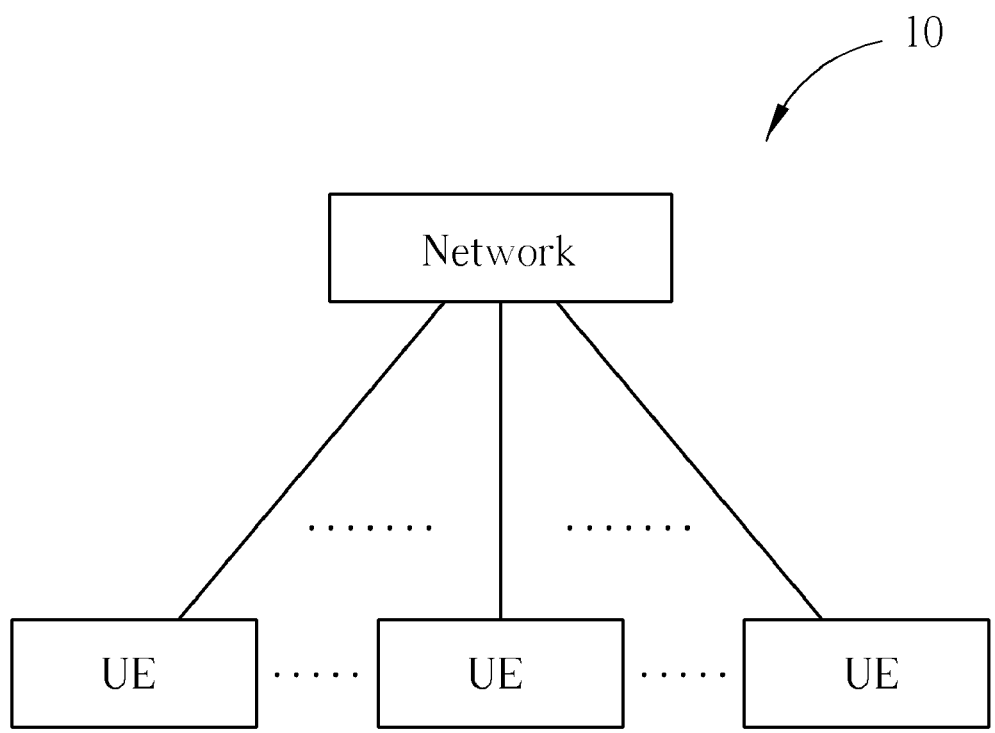
FIG. 2 is a schematic diagram of a wireless communication system.

Please refer to FIG. 2, which is a schematic diagram of a wireless communication system 10. The wireless communication system 10 can be a long-term evolution (LTE) system or a system of a further release version, such as an LTE-Advanced system, or other mobile communication systems. The wireless communication system 10 is briefly composed of a network and a plurality of user equipments (UEs), as the structure illustrated in FIG. 2. In the LTE system, the network is referred as an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 3:
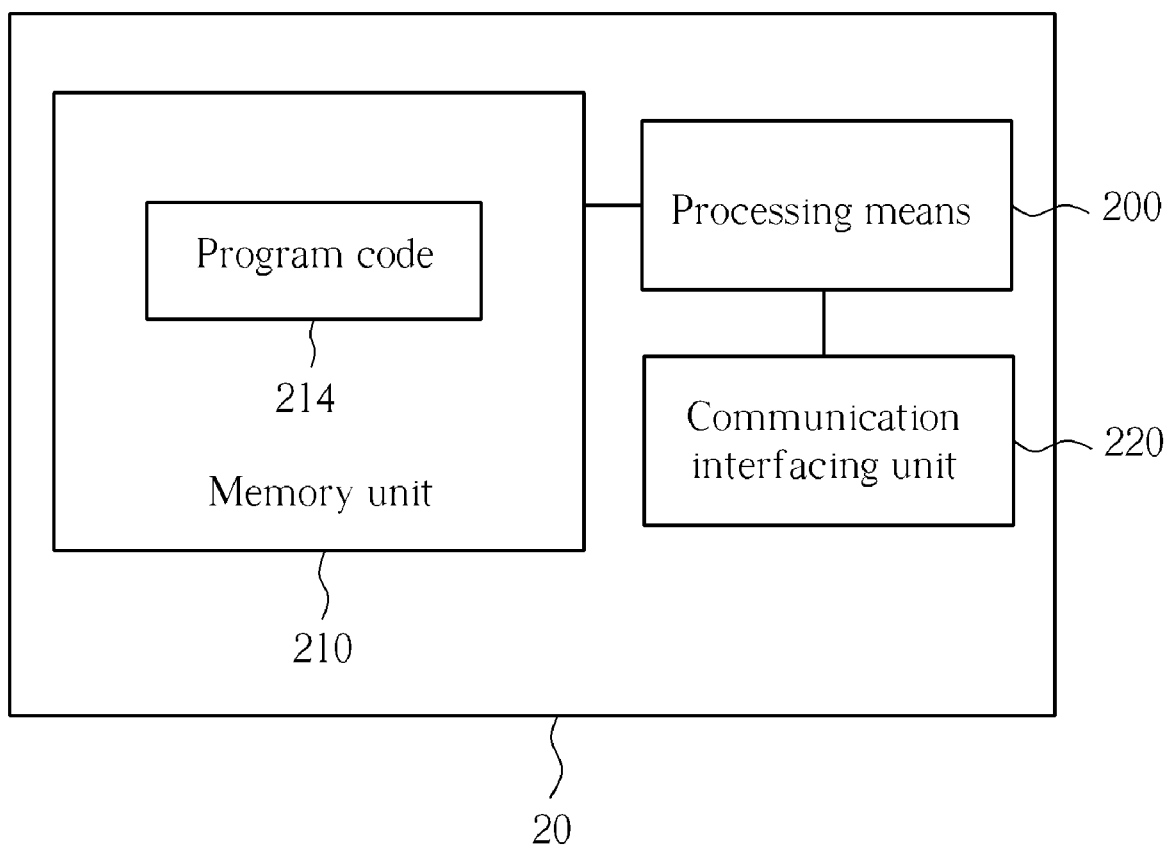
FIG. 3 is a schematic diagram of a communication device according to an example of the present invention.

Please refer to FIG. 3, which is a schematic diagram of a communication device 20 according to an example of the present invention. The communication device 20 can be the UE shown in FIG. 2 and includes a processing means 200 such as a microprocessor or ASIC, a memory unit 210, and a communication interfacing unit 220. The memory unit 210 may be any data storage device that can store program code 214 for access by the processor 200. Examples of the memory unit 210 include but are not limited to a subscriber identity module (SIM), read-only memory (ROM), random-access memory (RAM), CD-ROMs, magnetic tapes, floppy disks, and optical data storage devices. The communication interfacing unit 220 is preferably a radio transceiver for wirelessly communicating with the network.

Figure 4:
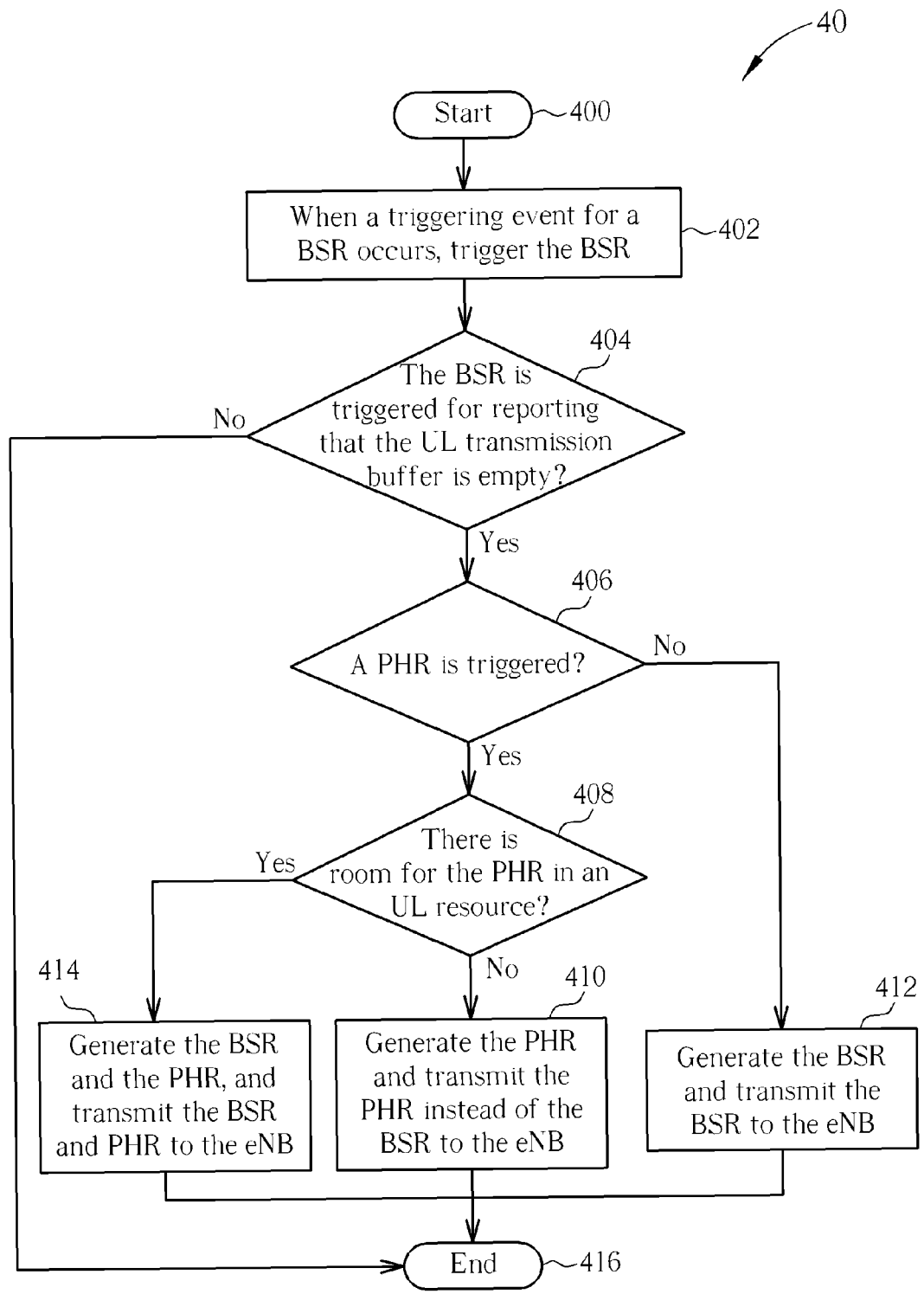
FIG. 4 is a flowchart of a process according to an example of the present invention.

Please refer to FIG. 4, which is a flowchart of a process 40 according to an example of the present invention. The process 40 is utilized for transmitting a power headroom report (PHR) and a buffer status report (BSR) for the MAC layer of a UE in the wireless communication system 10. Through the process 40, the UE transmits the PHR and the BSR when they are really required for the eNB, such that the modulation and coding scheme (MCS) is adapted in time. The process 40 can be compiled into the program code 214. The process 40 includes the following steps:

Step 400: Start.

Step 402: When a triggering event for a BSR occurs, trigger the BSR.

Step 404: Check whether the BSR is triggered for reporting that the UL transmission buffer is empty. When the BSR is triggered for reporting the empty UL transmission buffer, perform Step 406; else, perform Step 416.

Step 406: Check whether a PHR is triggered. When the PHR is triggered, perform Step 408; else, perform Step 412.

Step 408: Check whether there is room for the PHR in an UL resource. When there is not enough room for the PHR in the UL resource, perform 410; else, perform Step 414.

Step 410: Generate the PHR and transmit the PHR instead of the BSR to the eNB.

Step 412: Generate the BSR and transmit the BSR to the eNB.

Step 414: Generate the BSR and the PHR, and transmit the BSR and PHR to the eNB.

Step 416: End.

Note that the present invention does not redefine triggering events of the BSR and the PHR, which are the same with the current 3GPP MAC specification and are not given herein. Step 402 is a conventional step as in the prior art. According to Step 402, when a triggering event for the BSR occurs, the UE triggers the BSR for reporting a status of an UL transmission buffer, which indicates the size of the data available to be transmitted in the UL transmission buffer, to the eNB. According to Step 404, when the BSR is triggered, the UE checks whether the BSR is triggered for reporting that the UL transmission buffer is empty, and then performs Step 406 or Step 416 according to the status of the UL transmission buffer. When the UE detects that the BSR is not triggered for the empty UL transmission buffer, in other words, the BSR is triggered for the data available for transmission in the UL transmission buffer, the BSR is valuable for the eNB for allocating UL resources. In this situation, the UE leaves the process 40 and transmits the BSR as the UE does in the prior art in which the BSR is of higher priority.

On the other hand, when the UE detects that the BSR is triggered for reporting the empty UL transmission buffer, according to Step 406, the UE further checks whether a PHR is triggered. This is because the PHR is regarded as more important than the BSR reporting empty UL transmission buffer, which the eNB does not need to know about. The UE further performs Step 408 or Step 412 according to whether the PHR is triggered. When the UE detects no PHR is triggered, according to Step 412, the UE only generates the BSR and transmits the BSR, for reporting the empty UL transmission buffer to the eNB.

When the UE detects that the PHR is triggered, which implies that the UE intends to report both the empty BSR and the PHR, according to Step 408, the UE further checks whether there is enough room for the PHR to be transmitted in an UL resource, and performs Step 410 or Step 414 accordingly. Please note that, the UE follows a priority order that prioritizes the BSR than the PHR, as the priority order in the prior art, to check if there is enough room for the PHR in the UL resource. When the UE detects there is enough room for the PHR in the UL resource, which implies that the UL resource is large enough to transmit both of the BSR reporting the empty UL transmission buffer and the PHR, according to the Step 414, the UE generates the BSR and the PHR, and transmits the BSR and PHR through the UL resource to the eNB.

On the other hand, when the UE detects that there is not enough room for the PHR, the UE generates the PHR and transmits the PHR instead of the BSR. The UE only transmits the PHR and does not transmit the empty BSR because the PHR is more important than the empty BSR that is unnecessary for the eNB. Therefore, the PHR transmission is not segmented or delayed, and the eNB is able to adapt the MCS of the UE promptly according to the reported PHR, so that the transmission efficiency is improved.

Step 404, Step 406, Step 408, and Step 410 implement the main idea of the present invention that is to transmit the PHR instead of the BSR when the BSR is triggered for reporting the empty UL transmission buffer. The process 40 can be used when dynamic scheduling or semi-persistent scheduling (SPS) is configured, and is more beneficial to the condition when SPS is configured because most of the time the UE transmits all SPS data, e.g. VoIP data available in the UL transmission buffer through the SPS resource and left the UL transmission buffer empty. Through the process 40, UL resources used for transmitting unnecessary empty BSRs are reduced and PHRs have chances to be sent instead.

Figure 1:
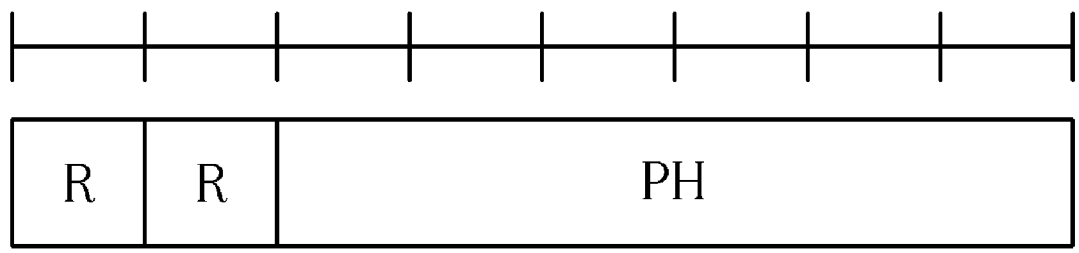
FIG. 1 is a diagram illustrating the format of a PHR MAC control element according to the prior art.
Figure 5:
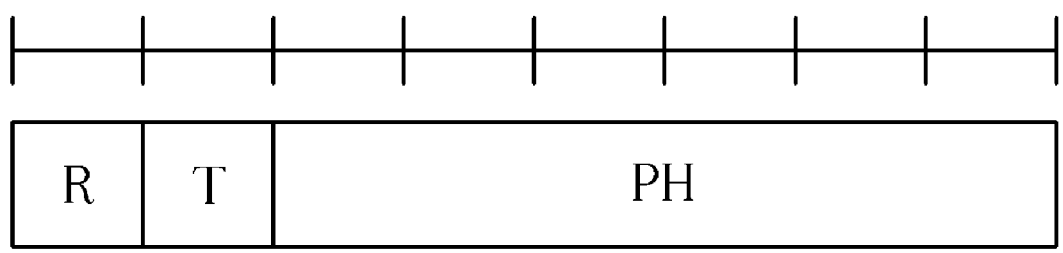
FIG. 5 is a diagram illustrating the format of a PHR MAC control element according to an example of the present invention.

The BSR and the PHR are MAC control elements. The PHR that replaces the empty BSR has different formats. One format is as the prior art shown in FIG. 1; by this format, the eNB receives the PHR without any information related to the empty UL transmission buffer. Please refer to FIG. 5, which is a diagram illustrating the format of a PHR MAC control element according to an example of the present invention. Idea of the format shown in FIG. 5 is using one bit of the PHR to indicate whether the BSR reports the empty UL transmission buffer. As shown in FIG. 5, the PHR MAC control element consists of 1-bit "R" field for a reserved bit, 1-bit "T" field indicating whether the BSR reports the empty UL transmission buffer, and 6-bit "PH" field indicating power headroom level. The "T" field is set to be identical to the "R" field to indicate that the PHR is independent of the BSR, which implies that the BSR is also transmitted. The "T" field is set to be different from the "R" field to indicate the empty BSR. For example, when the eNB receives a PHR with the "R" field set to 0 and the "T" field set to 1, the eNB recognizes that the UL transmission buffer is empty according to the "T" field of the PHR.

Please note that the abovementioned steps of the process 40 can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, according to the present invention, the UE transmits the PHR instead of the BSR when the BSR is triggered for reporting an empty UL transmission buffer, so that the eNB has chances to adapt the MCS of the UE in time according to the reported PHRs. Therefore, the transmission efficiency is enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for transmitting a power headroom report (PHR) and a buffer status report (BSR) for a user equipment in a wireless communication system, the method comprising:
   triggering a BSR when a triggering event for the BSR occurs, for reporting a status of an uplink transmission buffer of the user equipment to a network of the wireless communication system;
   checking whether the BSR is triggered for reporting that the uplink transmission buffer is empty;
   when the BSR is triggered for reporting that the uplink transmission buffer is empty, checking whether a PHR is triggered and whether there is room for the PHR in an uplink resource according to a priority order; and
   when the PHR is triggered and there is not enough room for the PHR in the uplink resource, generating the PHR and transmitting the PHR instead of the BSR to the network.

2. The method of claim 1, wherein the PHR transmitted instead of the BSR comprises one bit for indicating whether the BSR reports the empty uplink transmission buffer.

3. The method of claim 1 further comprising:
   when no PHR is triggered, generating the BSR and transmitting the BSR to the network, for reporting that the uplink transmission buffer is empty.

4. The method of claim 1 further comprising:
   when the PHR is triggered and there is enough room for the PHR in the uplink resource, generating the BSR and PHR; and
   transmitting the BSR and PHR to the network.

5. The method of claim 1, wherein the priority order that the user equipment follows to check whether there is room for the PHR in the uplink resource indicates that the BSR is prior than the PHR.

6. The method of claim 1, wherein the BSR and PHR are Medium Access Control (MAC) control elements.

7. A communication device of a wireless communication system for transmitting a power headroom report (PHR) and a buffer status report (BSR), the communication device comprising:
   means for triggering a BSR when a triggering event for the BSR occurs, for reporting a status of an uplink transmission buffer of the communication device to a network of the wireless communication system;
   means for checking whether a PHR is triggered when the BSR is triggered for reporting that the uplink transmission buffer is empty;
   means for checking whether there is room for the PHR in an uplink resource according to a priority order when the BSR is triggered for reporting that the uplink transmission buffer is empty and the PHR is triggered; and means for generating the PHR and transmitting the PHR instead of the BSR to the network when the PHR is triggered and there is not enough room for the PHR in the uplink resource.

8. The communication device of claim 7, wherein the PHR transmitted instead of the BSR comprises one bit for indicating whether the BSR reports the empty uplink transmission buffer.

9. The communication device of claim 7 further comprising:
means for generating the BSR and transmitting the BSR to the network when no PHR is triggered, for reporting that the uplink transmission buffer is empty.

10. The communication device of claim 7 further comprising:
means for generating the BSR and PHR when the PHR is triggered and there is enough room for the PHR in the uplink resource; and
means for transmitting the BSR and PHR to the network.

11. The communication device of claim 7, wherein the priority order that the communication device follows to check whether there is room for the PHR in the uplink resource indicates that the BSR is prior than the PHR.

12. The communication device of claim 7, wherein the BSR and PHR are Medium Access Control (MAC) control elements.

* * * * *